United States Patent
Lennox (10) Patent No.: US 8,616,896 B2
(45) Date of Patent: Dec. 31, 2013

(54) METHOD AND SYSTEM FOR COLLECTION, AGGREGATION AND DISTRIBUTION OF FREE-TEXT INFORMATION

(75) Inventor: Duncan Michael Lennox, Burlington, MA (US)

(73) Assignee: QStream, Inc., Burlington, MA (US)

( * ) Notice: Subject to any disclaimer, the term of this patent is extended or adjusted under 35 U.S.C. 154(b) by 156 days.

(21) Appl. No.: 13/116,437

(22) Filed: May 26, 2011

(65) Prior Publication Data

US 2011/0294106 A1 Dec. 1, 2011

Related U.S. Application Data

(60) Provisional application No. 61/348,887, filed on May 27, 2010.

(51) Int. Cl.
*G09B 7/02* (2006.01)

(52) U.S. Cl.
USPC ........... 434/322; 434/118; 434/323; 434/350; 434/362; 434/365; 705/14.1; 707/764; 707/768

(58) Field of Classification Search
USPC ................ 434/118, 322, 323, 350, 362, 365; 705/14.1; 707/764, 768
See application file for complete search history.

(56) References Cited

U.S. PATENT DOCUMENTS

| | | | | |
|---|---|---|---|---|
| 6,131,085 A * | 10/2000 | Rossides | ...... | 705/1.1 |
| 6,287,123 B1 * | 9/2001 | O'Brien | ...... | 434/118 |
| 6,652,283 B1 * | 11/2003 | Van Schaack et al. | ...... | 434/236 |
| 6,755,657 B1 * | 6/2004 | Wasowicz | ...... | 434/167 |
| 8,275,803 B2 * | 9/2012 | Brown et al. | ...... | 707/802 |
| 8,290,799 B2 * | 10/2012 | Arning et al. | ...... | 705/35 |
| 2002/0013814 A1 * | 1/2002 | Koto | ...... | 709/204 |
| 2002/0049805 A1 * | 4/2002 | Yamada et al. | ...... | 709/202 |
| 2002/0073176 A1 * | 6/2002 | Ikeda et al. | ...... | 709/219 |
| 2002/0107726 A1 * | 8/2002 | Torrance et al. | ...... | 705/12 |
| 2003/0129574 A1 * | 7/2003 | Ferriol et al. | ...... | 434/362 |
| 2004/0002047 A1 * | 1/2004 | Bruning et al. | ...... | 434/322 |
| 2005/0266387 A1 * | 12/2005 | Rossides | ...... | 434/323 |
| 2005/0277099 A1 * | 12/2005 | Van Schaack et al. | ...... | 434/322 |
| 2006/0160055 A1 * | 7/2006 | Osoegawa | ...... | 434/350 |
| 2007/0020602 A1 * | 1/2007 | Torrance et al. | ...... | 434/323 |
| 2007/0065797 A1 * | 3/2007 | Elgart | ...... | 434/322 |
| 2008/0254426 A1 * | 10/2008 | Cohen | ...... | 434/308 |
| 2009/0197236 A1 * | 8/2009 | Phillips, II | ...... | 434/350 |
| 2009/0248659 A1 * | 10/2009 | McCool et al. | ...... | 707/5 |
| 2009/0259642 A1 * | 10/2009 | Cao et al. | ...... | 707/4 |
| 2009/0287678 A1 * | 11/2009 | Brown et al. | ...... | 707/5 |
| 2010/0035225 A1 * | 2/2010 | Kerfoot, III | ...... | 434/335 |
| 2010/0057708 A1 * | 3/2010 | Billingsley | ...... | 707/4 |
| 2010/0161389 A1 * | 6/2010 | Arning et al. | ...... | 705/11 |
| 2010/0185957 A1 * | 7/2010 | Van Ieperen et al. | ...... | 715/753 |
| 2011/0087656 A1 * | 4/2011 | Oh et al. | ...... | 707/727 |

FOREIGN PATENT DOCUMENTS

WO    WO 2008/008370    1/2008

* cited by examiner

*Primary Examiner* — Jack Yip (74) *Attorney, Agent, or Firm* — Nixon Peabody LLP; Robert L. Pilaud (57) ABSTRACT

An interactive computer system and method collects, aggregates and distributes information derived from free-text responses to questions. The system and method collect free-text responses from a subject user and aggregates them with free-text responses from other users. The system and method then uses these free-text responses in learning methodologies (such as temporal spacing) and styles to facilitate long-term learning and knowledge retention.

64 Claims, 9 Drawing Sheets

Figure 1

"Submit" button

Figure 2

Question

Your Answer

Is you answer equivalent to these prior answers?

◊ Equivalent 1
◊ Equivalent 2
◊ Equivalent 3
◊ Equivalent 4

*\* ranked in order of popularity \*\**

◊ None of the above answers is equivalent

Please click on the prior answer that is equivalent to yours.
If more than one is equivalent, please click on the one highest on the list.

"Submit" button

Figure 3

| Question |
|---|
| |

| Your Answer |
|---|
| |

| Explanation / Feedback |
|---|
| |

| Your choice | Answer Choices | Rank | Percentages |
|---|---|---|---|
| | | 1 | |
| | | 2 | |
| | | 3 | |
| ▶ | | 4 | |
| | | 5 | |
| | | 6 | |
| | | 7 | |
| | | 8 | |
| | | 9 | |
| | | 10 | |

"Next question' button

Figure 4

> Question

> List of Top 10 Answers from Prior Responses
>   – in random order

Select the best answer.

"Submit" button

Figure 5

| Question | |
|---|---|

| Your choice | Answer Choices |
|---|---|
|  |  |
|  |  |
| ▶ |  |
|  |  |
|  |  |
|  |  |
|  |  |
|  |  |

| Explanation / Feedback |
|---|

Do you consider your answer to be correct?
- Yes – my answer is correct *(repeat as correct)*
- No – my answer is incorrect *(repeat as incorrect)*
- Not applicable – there is no 'correct' answers to this type of question *(repeat as correct)*
- None of the answer choices listed are correct *(repeat as correct)*

"Submit" button

Figure 6

Question

Top 10 List with percentages (in same order as prior)

| Your choice | Answer Choices | Rank | Percentages |
|---|---|---|---|
| | | 5 | |
| | | 3 | |
| | | 1 | |
| ▶ | | 6 | |
| | | 10 | |
| | | 2 | |
| | | 4 | |
| | | 9 | |
| | | 8 | |
| | | 7 | |

Explanation / Feedback

Congratulations, you have retired this question.
This question will be repeated on (date).

"Next question" button

METHOD AND SYSTEM FOR COLLECTION, AGGREGATION AND DISTRIBUTION OF FREE-TEXT INFORMATION

RELATED APPLICATION(S)

This application claims the benefit of U.S. Provisional Application No. 61/348,887, filed on May 27, 2010. The entire teachings of the above application are incorporated herein by reference.

BACKGROUND OF THE INVENTION

Effective education should generate long-term improvements in physicians' knowledge and practice patterns, not just short-term gains that quickly dissipate over time. Current methods of education often do not achieve this end. By clumping education into 'bolus' learning events without subsequent reinforcement, much of the material learned at lectures, seminars, hands-on practice sessions, and board-review courses will be quickly forgotten. This is not the fault of the learner—forgetting is a well-studied, natural physiological process that should be expected.

Applicants have found that a new form of online education (termed in the art 'spaced education') that can substantially improve long-term retention of learning. Spaced education courses consist of a series of questions and explanations that are presented to learners via email on computers and mobile devices. Based on each learner's performance, the spacing, reinforcement, and content of the subsequent material adapts for that individual until mastery of the content is achieved.

Spaced education is based on two core psychology research findings, the spacing and testing effects. The 'spacing effect' refers to the finding that information which is presented and repeated over spaced intervals is learned and retained more efficiently than information presented at a single time-point. The spacing effect appears to have a distinct neurophysiologic basis. A protein tyrosinephosphatase has been identified which regulates the spacing effect in *Drosophila* (Pagani, M. R., Oishi K., Gelb, B. D. et al.: The Phosphatase SHP2 regulates the spacing effect for long-term memory induction. Cell, 139: 189, 2009). In addition, spaced learning by rats was found to improve neuronal longevity in the hippocampus (a primary memory center in the brain). See Sisti, H. M., Glass, A. L., Shors, T. J.: Neurogenesis and the spacing effect: Learning over time enhances memory and the survival of new neurons. Learn Mem, 14: 368, 2007. By presenting material in a question-answer testing format, spaced education also harnesses the educational merits of the 'testing effect'. The 'testing effect' refers to the psychological finding that the process of testing does not merely assess the knowledge levels of individuals. Rather, testing alters the learning process itself so that new knowledge is retained more effectively (Karpicke, J. D., Roediger, H. L., $3^{rd}$: The critical importance of retrieval for learning. Science, 319: 966, 2008).

To date, more than 10 large randomized trials have been conducted to show that spaced education improves knowledge acquisition, (Kerfoot, B. P., Kearney, M. C., Connelly, D. et al.: Interactive spaced education to assess and improve knowledge of clinical practice guidelines: a randomized controlled trial. Ann Surg, 249: 744, 2009) boosts learners' abilities to self-assess their performance, and improves knowledge retention (Kerfoot, B. P.: Learning benefits of on-line spaced education persist for 2 years, J Urol, 181: 2671, 2009). In one trial of 1067 medical students at 4 medical schools, spaced education increased longer-term retention by 170%. In another with 95 clinicians at 8 medical centers, spaced education reduced inappropriate prostate cancer screening by 40% for more than a year after the intervention. In a trial of 724 urology residents across the US, spaced education improved long-term learning efficiency 4-fold and was preferred 3:1 over web-based teaching modules.

Spaced education to date has utilized question types of the following formats: multiple-choice question (single correct answer), multiple correct answer, and fill-in-the-blank. These question formats are appropriate for questions that have a correct answer, but many important questions (e.g. in the fields of ethics, politics, religion, etc) do not have distinct correct answers. Given this, a new question format is needed that can accommodate a range of potential answers without the need for there to be a correct answer designated by the question writer. Applicants hypothesize that free-text question format would be ideal since it could capture a broad range of nuanced responses. Psychological research on the testing effect has also shown that questions utilizing non-cued free-text responses generate greater long-term retention of knowledge than cued-response question formats (Kang, S. H. K., McDermott, K. B., Roediger, H. L.: Test format and corrective feedback modify the effect of testing on long-term retention. European Journal of Cognitive Psychology, 19 528, 2007).

SUMMARY OF THE INVENTION

The present invention addresses the above shortcomings of the art. The present invention provides a computer based method and system that enhances knowledge acquisition and retention using free-text format questions and responses. In particular, embodiments provide computer methods and systems of collecting, aggregating and distributing information derived from free-text responses to questions, including concepts, principles, facts, methods, plans, and the like. The computer based system and method of the present invention includes delivering a question to a user, recording the user's free-text response to the question, determining potentially-equivalent answers to the question, presenting a selected list of prior responses to the user, and having the user select which answer on the list is the best answer to the question. Users may include students, on-line users, chat room participants, and the like. The question may be delivered via electronic media such as an email, a facsimile, instant messaging, XML, web page, a posting, a chat room discussion, and the like.

One novel aspect of the method and system is that it incorporates a computer system by which the free-text responses can be aggregated into meaningful summary data. This is accomplished by calculating (via a processor or computer) a list of potentially-equivalent responses to a user's response to the question, and then having the user determine whether his response is in fact equivalent to others on the list. The user is the best person to understand the nuances of his response and thus can provide a very effective means to determine shades of meaning.

Another novel aspect of the invention method and system is that the system translates the summary response data into a multiple-choice question format. The user then selects the response that he feels is the best answer to that question. This method and system taps the collective wisdom of the users and generates a summary list of the best responses.

In one embodiment, the system and method of the present invention provides the user with feedback and educational material to foster learning about the pertinent concepts. The present invention, by combining a free-text question-answer process with the provision of feedback, improves the learner's ability to learn, recall, and retain items of information.

In another embodiment, the user is asked to report whether his selected answer from the calculated list is a correct answer to the question. This can be an important step, since the popularity of an answer does not necessarily correlate with its correctness. In embodiments, correctness can also be determined by one or more computers or one or more other people.

In another embodiment, the spacing, difficulty, and/or content of subsequent questions and educational material is customized for each learner based on the correctness of his answer.

While the primary focus of this method and system is to improve the educational process, it has not escaped Applicant's notice that this method and system is also an excellent means to aggregate free-text responses to questions. This is of particular value now that online search engines are aiming to be able to answer submitted questions, not just provide a list of relevant web sites. The method and system in this disclosure allow for the population of a database with the answers to questions, with weightings given to the answers based on the popularity and correctness of the answers.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

The accompanying drawings illustrate an embodiment of the invention and depict the above-mentioned and other features of this invention and the manner of attaining them. In the drawings.

DETAILED DESCRIPTION OF THE INVENTION

A description of example embodiments of the invention follows. The entire teachings of PCT Publication no. WO 2008/008370 published Jan. 17, 2008 for "Adaptive Spaced Teaching Method and System" are herein incorporated.

Figure 8:
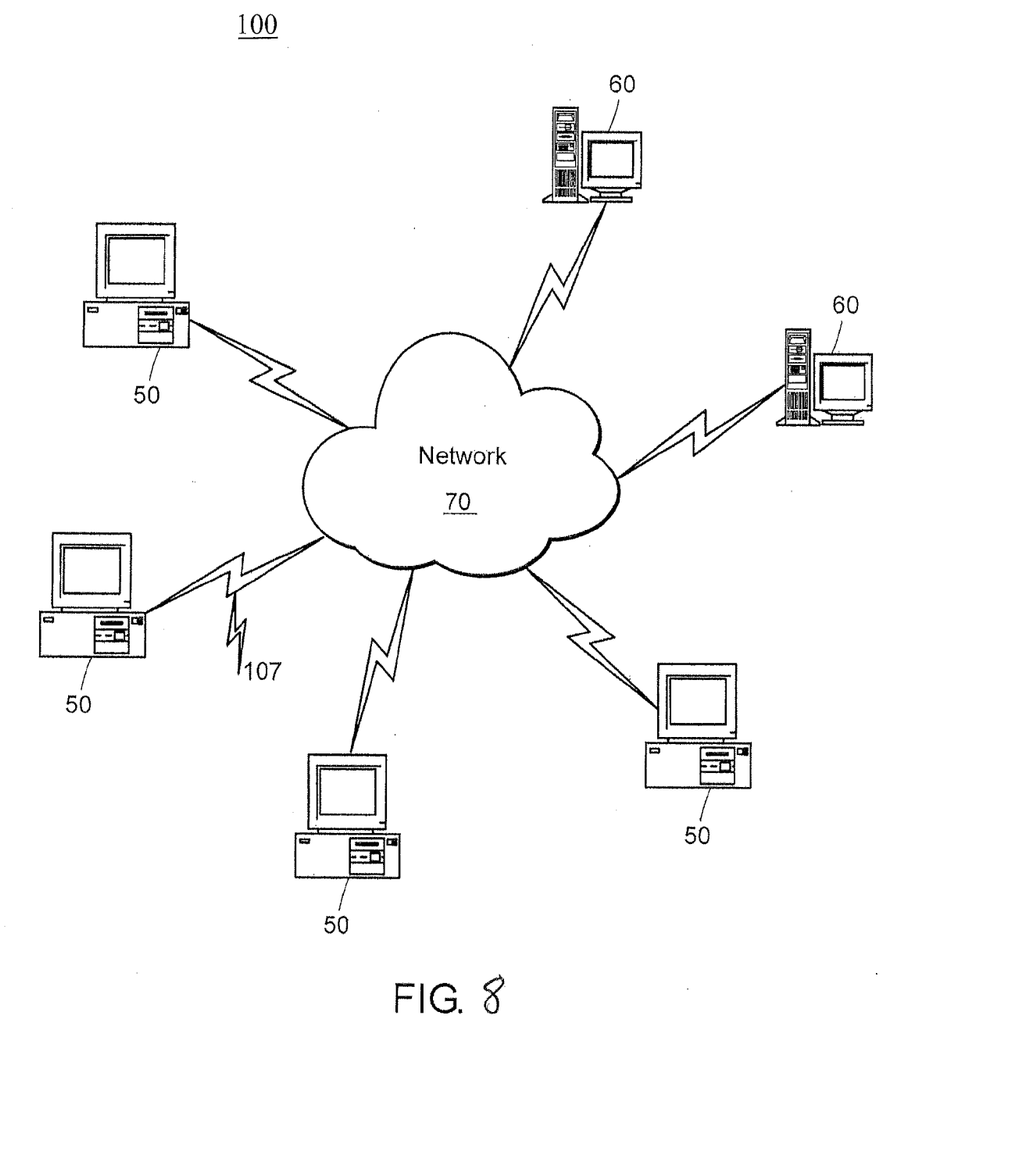
FIG. 8 is a schematic view of a computer network in which embodiments of the present invention are deployed.

FIG. 8 illustrates a computer network or similar digital processing environment in which the present invention may be implemented. An exemplary system 100 is shown and described.

Client computer(s)/devices 50 and server computer(s) 60 provide processing, storage, and input/output devices executing application programs and the like. Client devices 50 may be, for example, a desktop or laptop computer, a portable media device, a personal digital assistant, a mobile communication device and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 9:
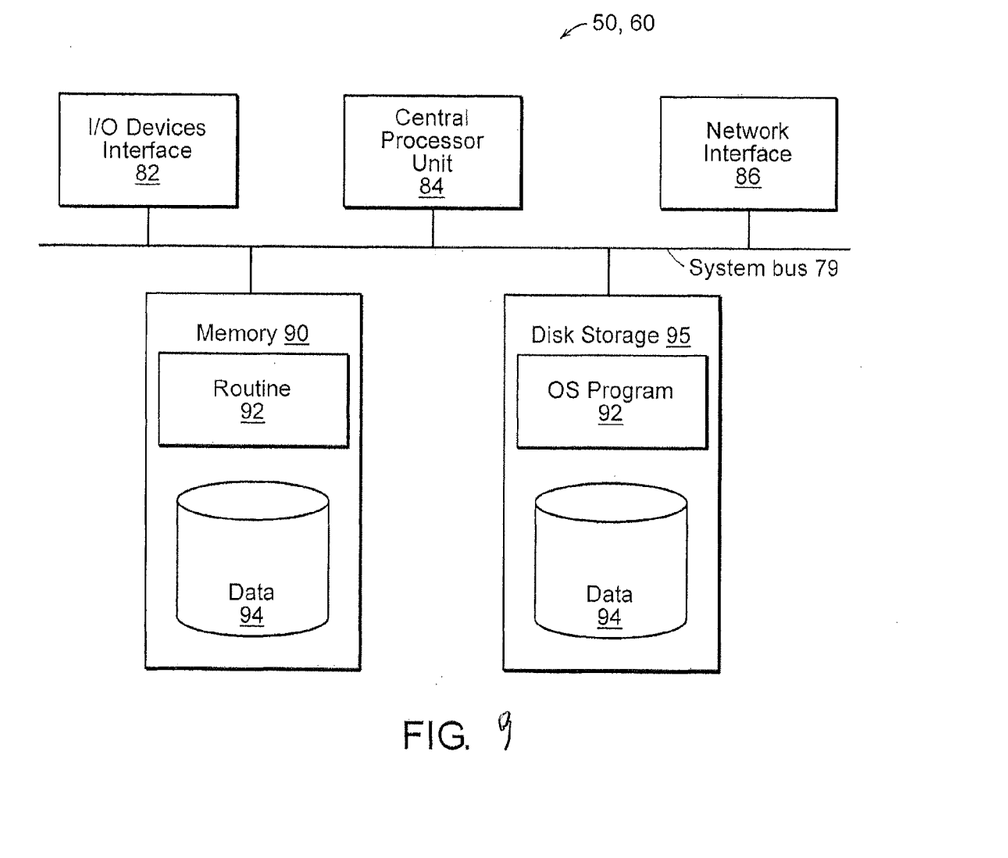
FIG. 9 is a block diagram of a computer node in the network.

FIG. 9 is a diagram of the internal structure of a computer (e.g., client processor/device 50 or server computers 60) in the computer system of FIG. 8. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 8). Memory 90 provides volatile storage for computer software instructions 92 and data 94 used to implement an embodiment of the present invention (e.g., system process 100 of FIG. 1 and user interface operations of FIGS. 2 through 7 and supporting code detailed below). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

Figure 1:
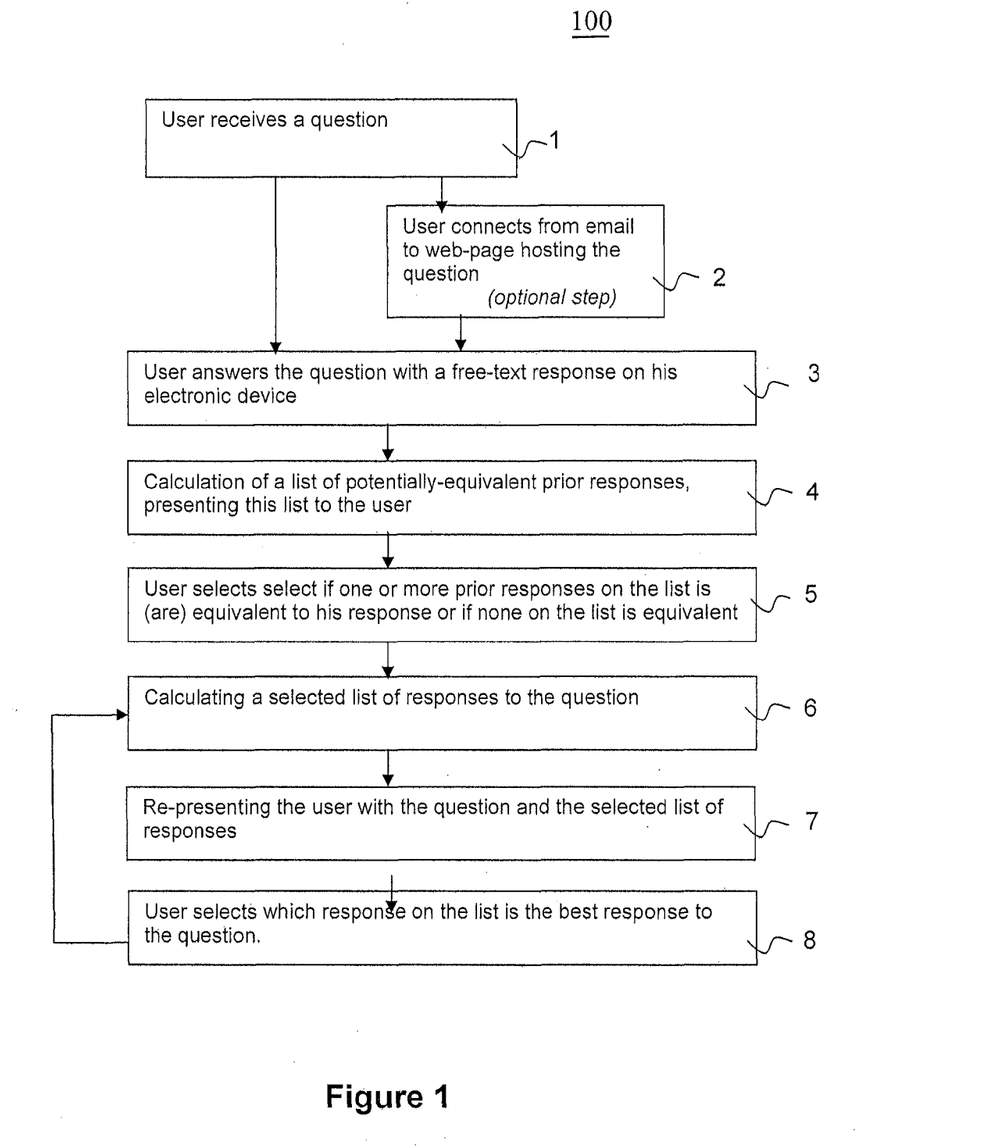
FIG. 1 shows a flowchart illustrating a process of collection and distribution of free-text information in accordance with the present invention.
Figure 2:
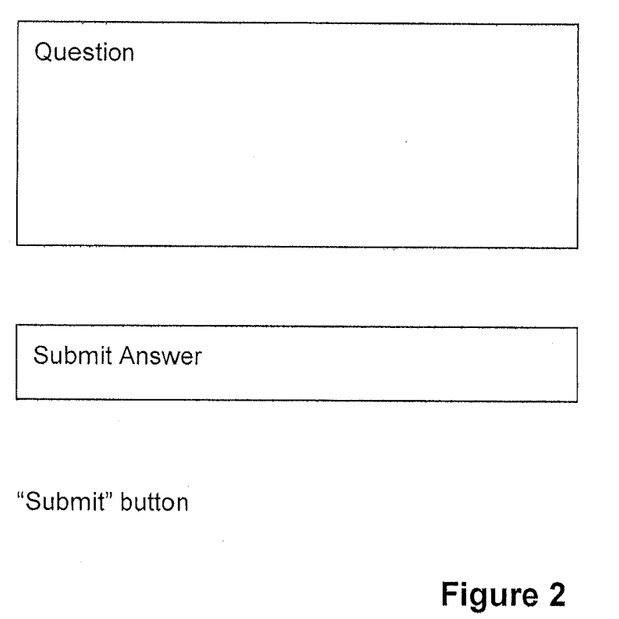
FIG. 2 shows the presentation of a question to a user to which the user can submit a free-text response.

Illustrated in FIG. 1 is a flow diagram of a process of collection and distribution of free text information in one embodiment (system 100) of the present invention. At Step 1 a subject user of a device 50 receives a question provided by host web page server 60. Email, text message or other electronic delivery techniques are employed. Optionally in Step 2 the user connects from an email application to the web page (server 60) hosting the question. Hyperlink or equivalent technology may utilized. In turn, the user answers the question with a free-text response through his electronic device 50 (at Step 3). Device 50 and server 60 communicate with each other over communications network 70 using known or common protocols and techniques. FIG. 2 is illustrative of a user interface screen view implementing Steps 1, 2 and 3.

Figure 3:
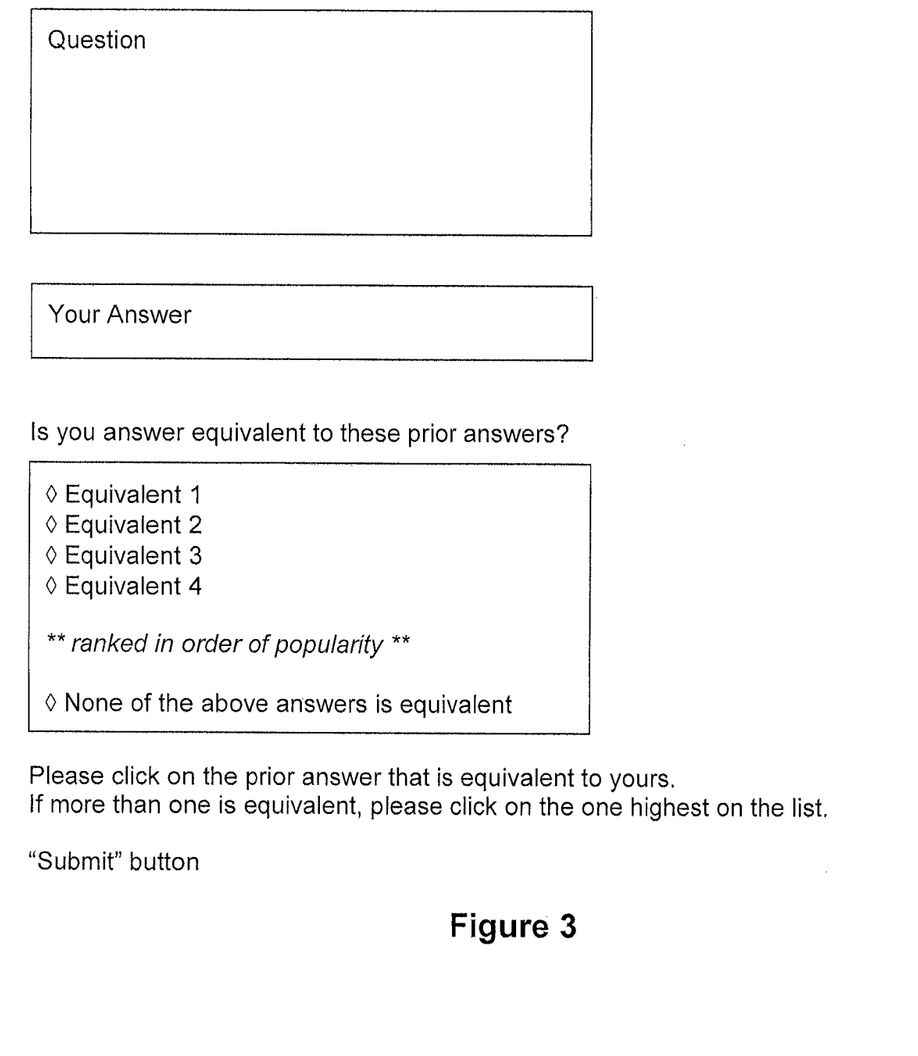
FIG. 3 shows the presentation of a list of potentially-equivalent free text responses to the user, and asking him to select if one or more prior responses on the list is (are) equivalent to his response or if none on the list is equivalent.

In Step 4, server 60 calculates a list of potentially equivalent prior responses and presents this list to the subject user (through device 50) such as shown in FIG. 3. Identification of equivalent prior responses may be by a computer or with human intervention. This may be accomplished by keyword matching or other techniques. In Step 5, through device 50 (in working communication with server 60), the subject user selects if one or more prior responses on the presented list (FIG. 3) is/are equivalent to his response, or indicates if none on the presented list is equivalent.

Figure 4:
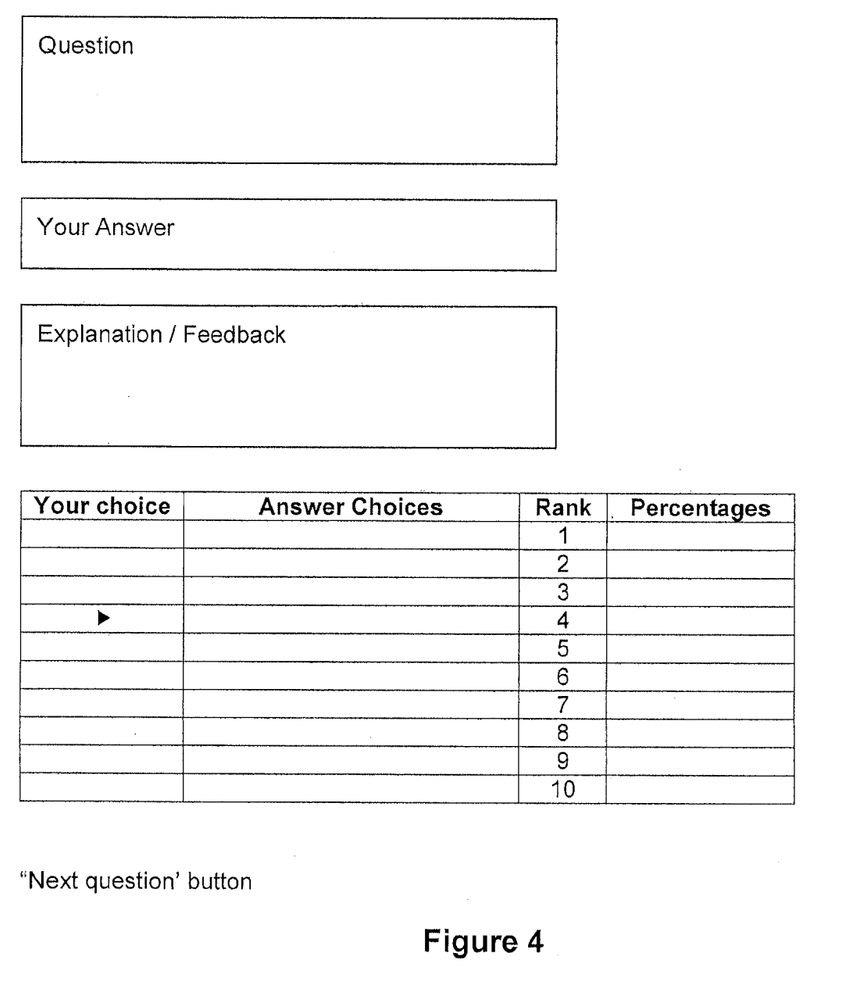
FIG. 4 shows the presentation to the user of the correct answer(s) to the question(s) and/or educational material to foster learning about the topic covered by the question.

In response, server 60 at Step 6 then calculates a selected list of responses to the question. In one embodiment, this includes correct answer(s) to the question and/or educational material fostering learning about the topic covered by the question. FIG. 4 is illustrative.

In another embodiment, server 60 calculates the selected list of responses to the question by tallying the most popular answers to the question as indicated by the number of equivalent answers submitted by users.

Figure 5:
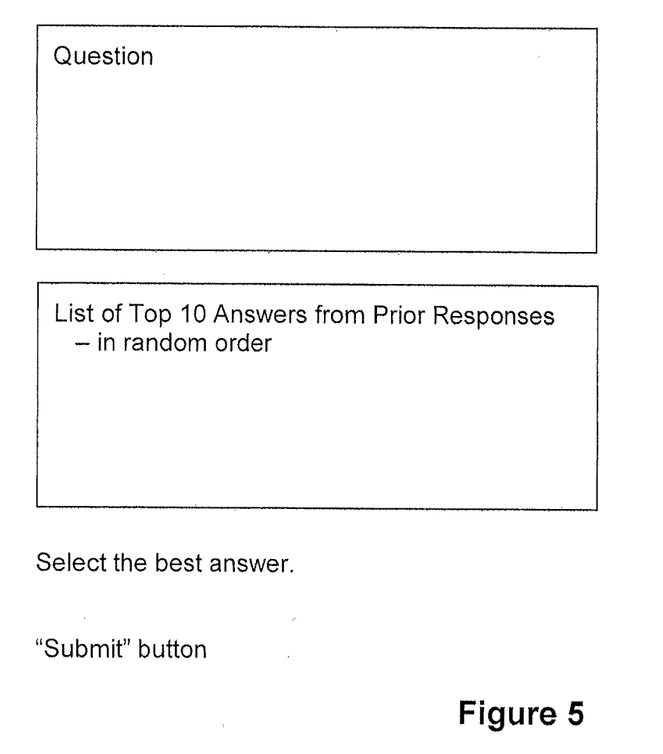
FIG. 5 shows the re-presentation of the question and a newly-calculated list of selected responses to the user and electronically recording which response on this list the user selects as the best response to the question.
Figure 6:
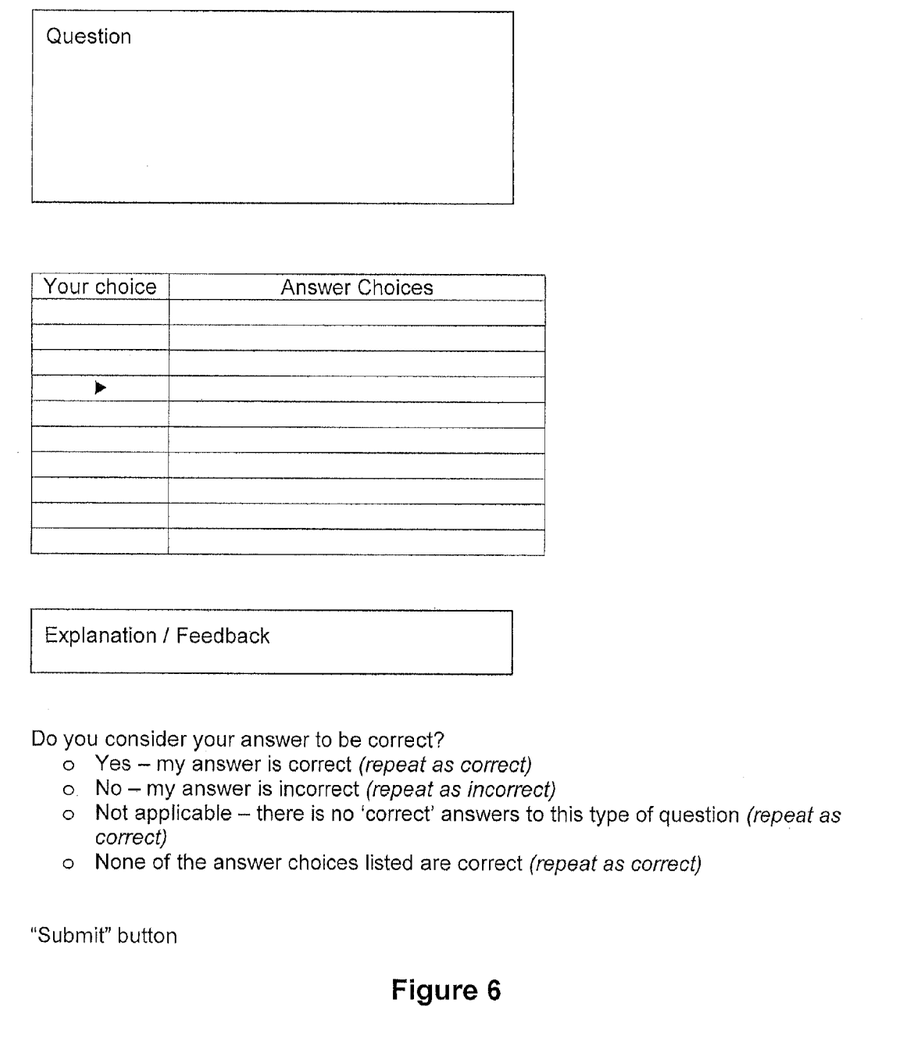
FIG. 6 shows the presentation to the user of a list of answer(s) to the question(s) and/or educational material to foster learning about the topic covered by the question. The user may be asked to determine whether his selected answer is correct or incorrect or whether the question has no correct/incorrect answer.
Figure 7:
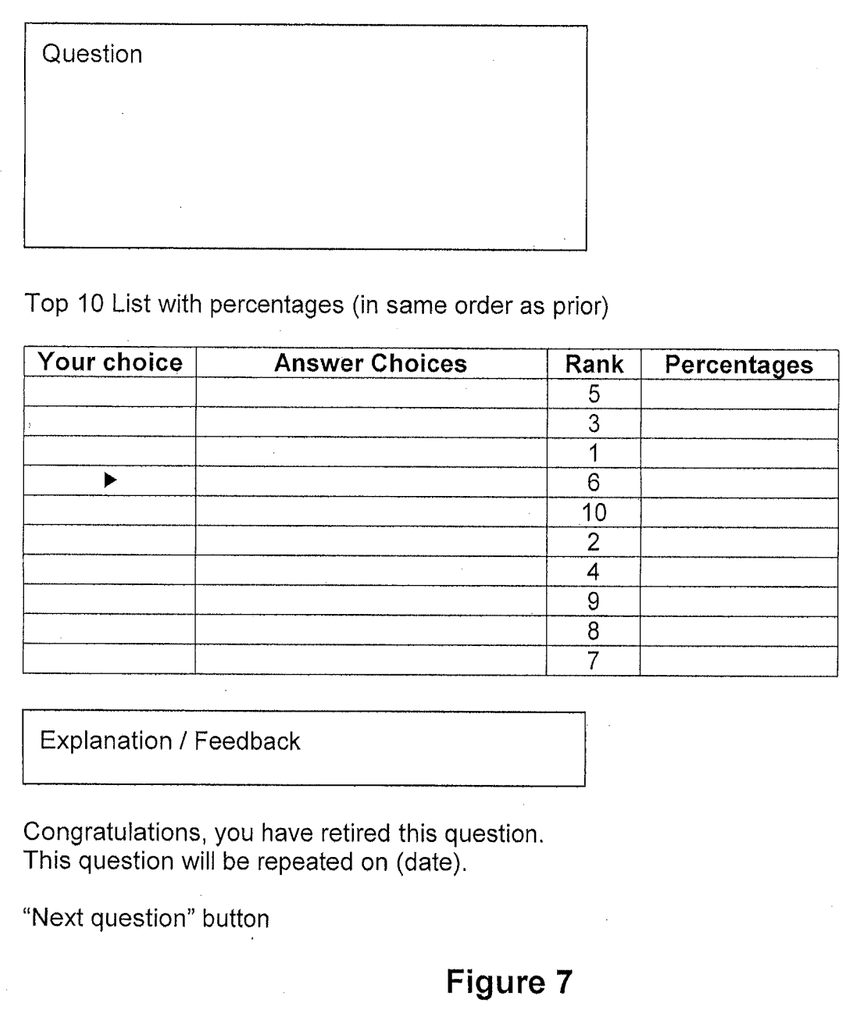
FIG. 7 shows the presentation to the user of a list of answer(s) to the question(s) and/or educational material to foster learning about the topic covered by the question.

Step 7 (server 60 through device 50) then re-presents to the user the question and the calculated selected list of responses, such as in the illustrated screen view of FIG. 5. Step 8 (device 50) enables the user to select which response on the list as presented by Step 7 (FIG. 5) is the best response to the question. This may be by device 50 (as supported by server 60) presenting to the user a screen view having a list of answers to the questions and/or educational material on topic as in FIGS. 6 and 7. Optionally, in one embodiment, the screen view may ask the user to determine whether his answer is correct or incorrect.

In embodiments, server 60 and device 50 are configured at Step 7 so that the question and calculated selected list of responses to the question are re-presented to the user over spaced intervals of time until the user reaches a pre-established level of proficiency. The server 60/device 50 determine the temporal spacing of the question re-presentation by whether the user indicates that his selected answer (Step 8) is correct or incorrect or whether the question has no correct/incorrect answer.

In other embodiments, the temporal spacing of the question re-presentation is determined by whether one or more computers determines that the user's selected answer (Step 8) is correct or incorrect or whether the question has no correct/incorrect answer.

In yet further embodiments, the temporal spacing of the question re-presentation is determined by whether one or more persons determines that the user's selected answer (Step 8) is correct or incorrect or whether the question has no correct/incorrect answer.

Other techniques are suitable for determining the temporal spacing and hence delivery interval of the question/calculated selected list of responses to the question re-presentation of Step 7.

Server 60 calculates a spacing-based factor of a new one of the delivery intervals where the new delivery interval for delivery of a subsequent question is increased for questions that have been answered correctly, and the new delivery interval for delivery of a subsequent question is decreased for questions that have been answered incorrectly.

When the user meets a pre-established level of proficiency on content of a given difficulty level, server 60 delivers subsequent questions that are of a greater difficulty level. To accomplish this, server 60 may calculate a difficulty-based factor of the new level of difficulty whereby the new level of difficulty of a subsequent question is increased for questions that have been answered correctly and the new level of difficulty of a subsequent question is decreased for questions that have been answered incorrectly.

When the user meets a pre-established level of proficiency in a given content area, server 60 delivers subsequent questions that pertain to a new content area. To accomplish this, server 60 may calculate a content area-based proficiency factor whereby the subsequent question includes a new content area when the user meets a pre-established or threshold content area-based proficiency factor.

In other embodiments, when the calculated new level of difficulty, the calculated new delivery interval, and the calculated new content area for a subsequent question are unchanged, server 60 provides the subsequent question at the same level of difficulty, delivered at the same delivery interval, and pertaining to the same content area as an initial question.

When at least one of the calculated new level of difficulty, the calculated new delivery interval, and the calculated new content area for the subsequent question includes a change, server 60 provides at least one of a new level of difficulty, a new delivery interval, or a new content area for the subsequent question.

Employing the above, invention system 100 electronically delivers the question to the user in a manner that adapts to the learning needs of the user using temporal spacing. In this way, a user with a lower baseline knowledge level in a content area receives a subsequent question more frequently than a user having a higher baseline knowledge level in the same content area.

In embodiments, server 60 stores the responses to the questions and their metadata (including but not limited to popularity and equivalent answers) in a searchable electronic database (e.g., at 94 in FIG. 9). For example, questions are internally represented by content (in free-text format) and characteristics such as level of difficulty, proficiency category (level), content area, key words and correct and equivalent answers (e.g., links or pointers thereto) and the like metadata.

Answers are internally represented by content (e.g. in free text format) and characteristics such as keywords, best answer indicator, popular answer count, link/pointer to equivalent answers, and the like metadata. Various data structures (at 94 in FIG. 9) are suitable for storing questions, their metadata/characteristics, answers and their metadata/characteristics. Similarly users may be internally represented in working memory 90, 95 by a user identifier, indication of operative proficiency level and working aspects such as current question, delivery time period (temporal spacing)/frequency, user's current submitted selections and free-text responses, prior responses, prior questions and the like metadata. Suitable data structures in data 94 are in the purview of one skilled in the art.

Server 60 and client device 50 may iterate Steps 6, 7 and 8 in order to refine which response is effectively equivalent to the user's response and/or which response the user selects is the best response to the question. In embodiments, server 60/device 50 repeat Steps 7 and 8 one or more times over spaced intervals of time, each time presenting the same calculated selected list of responses to the question from which the user selects the best answer. Or server 60/device 50 repeat Steps 6-8 one or more times over spaced intervals of time, each time presenting a newly-calculated selected list of responses to the question from which the user selects the best answer. The first and/or newly-calculated selected list may present the most popular responses to the question. The first and/or newly-calculated selected list may present prior responses selected based on multiple variables, including but not limited to popularity, syntax, and key words. Known techniques are used to accomplish this.

In other embodiments, the newly-calculated selected list may contain the same prior responses as when it was presented to the user previously.

In accordance with the foregoing, system 100 collects the user's responses (in free-text) and aggregates them with other user's free-text responses. This results in information in a useful free-text format, especially for enhancing knowledge retention and learning as illustrated above throughout the various embodiments.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

For example, the foregoing describes a client-server architecture implementing one embodiment of the present invention. Other computer architectures, configurations and/or arrangements for implementing embodiments of the invention are suitable.

Further, the foregoing refers to questions generally. One example are test items (test questions). Other types of questions and queries are suitable.

In another example, the user's free text responses are limited to a threshold number of characters, such as 140 characters.

In yet a further example, server 60 is a central processing component (host-server) of system 100. The questions, responses and/or educational material are delivered on-line over a communications or other network 70.

In another example embodiment, server 60 employs a predetermined interval of time to separate the initial presentation of the question for a free-text response by the user (Steps 1, 2, 3) and the re-presentation of the question and the selected list of responses of Steps 7 and 8.

What is claimed is:

1. A method of collecting information from users and aggregating it into a useful format, the method comprising:
through a computer device and server computer in communication with each other:
 a. presenting a question to a subject user at the computer device;
 b. electronically recording, by the server computer, the subject user's free text response to the question;
 c. calculating a list of one or more prior free text responses from other subject users which may be equivalent to response of the subject user;
 d. presenting the calculated list of potentially-equivalent free text responses from other subject users to the subject user at the computer device;
 e. the subject user selecting if one or more prior responses on the list are equivalent to the subject user's response or if none on the list is equivalent;
 f. electronically recording, by the server computer, the subject user's selection of an equivalent response;
 g. calculating a selected list of responses to the question;
 h. re-presenting the question and the selected list of responses to the subject user at the computer device;
 i. electronically recording, by the server computer which response on the selected list the subject user selects as the best response to the question;
 such that responses from the subject user are collected and aggregated into the responses from other subject users in a manner resulting in information enhancing knowledge retention and learning.

2. The method of claim 1, wherein the question is electronically delivered to the subject user through electronic mail, text message, or other method of electronic delivery.

3. The method of claim 2, wherein the electronic mail or text message or other method of electronic delivery comprises hyperlink to a web-page where the subject user can submit the subject user's answer to the question.

4. The method of claim 1, wherein the calculating steps are performed at a central server.

5. The method of claim 1, wherein the steps of presenting the question and re-presenting are accomplished by delivering the question to a computer, portable media device, personal digital assistant, or mobile email receiver as the computer device.

6. The method of claim 1, wherein the calculating steps are performed on the subject user's computer, portable media device, personal digital assistant, or mobile email receiver.

7. The method of claim 1, wherein the calculating in step c includes identification of equivalent responses, said identification being performed by a computer.

8. The method of claim 1, wherein the calculating in step c includes identification of equivalent responses, said identification being is performed by a person different from the subject user.

9. The method of claim 1, wherein the calculating a list of one or more prior free text responses from other subject users (step c) is performed electronically by matching key words of the subject user's response to those in prior responses.

10. The method of claim 1, wherein the calculating of a selected list of responses to the question (step g) is performed electronically through a tally of the most popular answers to the question, as indicated by the number of equivalent answers submitted by users.

11. The method of claim 1, wherein a pre-determined interval of time separates the initial presentation of the question for a free-text response of steps a and b and the re-presentation of the question and the selected list of responses of steps h and i.

12. The method of claim 1, wherein steps h and i are repeated one or more times over spaced intervals of time, each time presenting the same calculated list of responses to the question from which the subject user selects the best answer.

13. The method of claim 1, wherein steps g through i are repeated one or more times over spaced intervals of time, each time presenting a newly-calculated list of responses to the question from which the subject user selects the best answer.

14. The method of claim 13, wherein the newly-calculated list presents the most popular responses to the question.

15. The method of claim 13, wherein the newly-calculated list presents prior responses selected based on multiple variables, including but not limited to popularity, syntax, and key words.

16. The method of claim 13, wherein the newly-calculated list contains the same prior responses as when it was presented to the user previously.

17. The method of claim 1, wherein the question comprises a target curriculum; and
    the method further comprising:
    j. creating a set of curricular objectives;
    k. developing a set of questions and answers that teach the set of curricular objectives.

18. The method of claim 1, further comprising the step of providing the subject user with the correct answer(s) to the question and/or educational material to foster learning about the topic covered by the question.

19. The method of claim 1, wherein the subject user is asked to determine whether the subject user's selected answer of step i is correct or incorrect or whether the question has no correct/incorrect answer.

20. The method of claim 1, wherein the correctness of the answer and its components is determined by one or more computers.

21. The method of claim 1, wherein the correctness of the answer and its components is determined by one or more persons.

22. The method of claim 1, wherein the question and the selected list of responses to the question in step h are re-presented to the subject user over spaced intervals of time until the subject user reaches a pre-established level of proficiency.

23. The method of claim 22, wherein the temporal spacing of the question re-presentation is determined by whether the subject user indicates that the subject user's selected answer in step i is correct or incorrect or whether the question has no correct/incorrect answer.

24. The method of claim 22 wherein the temporal spacing of the question re-presentation is determined by one or more computers determining that the subject user's selected answer in step i is correct or incorrect or whether the question has no correct/incorrect answer.

25. The method of claim 22 wherein the temporal spacing of the question re-presentation is determined by one or more persons determining that the subject user's selected answer in step i is correct or incorrect or whether the question has no correct/incorrect answer.

26. The method of claim 22, wherein a spacing-based factor of a new one of the delivery intervals is calculated, whereby the new delivery interval for delivery of a subsequent question is increased for questions that have been answered correctly and the new delivery interval for delivery of a subsequent question is decreased for questions that have been answered incorrectly.

27. The method of claim 22, wherein when the subject user meets a pre-established level of proficiency on content of a given difficulty level, subsequent questions are delivered which are of a greater difficulty level.

28. The method of claim 27, wherein a difficulty-based factor of the new level of difficulty is calculated, whereby the new level of difficulty of a subsequent question is increased for questions that have been answered correctly and the new level of difficulty of a subsequent question is decreased for questions that have been answered incorrectly.

29. The method of claim 22, wherein when the subject user meets a pre-established level of proficiency in a given content area, subsequent questions are delivered which pertain to a new content area.

30. The method of claim 22, wherein at least one of a calculated new level of difficulty, a calculated new delivery interval, and a calculated new content area for a subsequent question includes a change to at least one of the level of difficulty, the delivery interval, or the content area for the subsequent question.

31. The method of claim 22, wherein re-presenting the question and the selected list of responses to the subject user is adapted to the learning needs of the subject user using temporal spacing, wherein a subject user with a lower baseline knowledge level in a content area receives a subsequent question more frequently than a subject user having a higher baseline knowledge level in the same content area.

32. The method of claim 1, wherein the responses to the questions and their metadata (including but not limited to popularity and equivalent answers) are entered into a searchable electronic database.

33. A computer system for collecting information from users and aggregating it into a useful format, comprising:
    a server computer;
    a client device coupled to the server by a communication network, the server computer and client device being operatively configured to:
    a. present a question to a subject user;
    b. electronically record the subject user's free text response to the question;
    c. calculate a list of one or more prior free text responses from other subject users which may be equivalent to response of the subject user;
    d. present the calculated list of potentially-equivalent free text responses from other subject users to the subject user;
    e. the subject user selecting if one or more prior responses on the list is equivalent to the subject user's response or if none on the list is equivalent;
    f. electronically record the subject user's selection of an equivalent response;
    g. calculate a selected list of responses to the question;
    h. re-present the question and the selected list of responses to the subject user;
    i. electronically record which response on the selected list the subject user selects as the best response to the question;
    such that responses from the subject user are collected and aggregated into the responses from other subject users in a manner resulting in information enhancing knowledge retention and learning.

34. The system of claim 33, wherein the question is electronically delivered to the subject user through electronic mail, text message, or other method of electronic delivery.

35. The system of claim 34, wherein the electronic mail or text message or other system of electronic delivery comprises hyperlink to a web-page where the subject user can submit the subject user's answer to the question.

36. The computer system of claim 33 wherein the question and the selected list of responses to the question are re-presented to the subject user over spaced time intervals until the subject user reaches a threshold level of proficiency.

37. The system of claim 36, wherein the temporal spacing of the question re-presentation is determined by whether the subject user indicates that the subject user's selected answer in step i is correct or incorrect or whether the question has no correct/incorrect answer.

38. The system of claim 36, wherein the temporal spacing of the question re-presentation is determined by one or more computers determining that the subject user's selected answer in step i is correct or incorrect or whether the question has no correct/incorrect answer.

39. The system of claim 36, wherein the temporal spacing of the question re-presentation is determined by one or more persons determining that the subject user's selected answer in step i is correct or incorrect or whether the question has no correct/incorrect answer.

40. The system of claim 36, wherein a spacing-based factor of a new one of the delivery intervals is calculated, whereby the new delivery interval for delivery of a subsequent question is increased for questions that have been answered correctly and the new delivery interval for delivery of a subsequent question is decreased for questions that have been answered incorrectly.

41. The system of claim 36, wherein when the subject user meets a pre-established level of proficiency on content of a given difficulty level, subsequent questions are delivered which are of a greater difficulty level.

42. The system of claim 41, wherein a difficulty-based factor of the new level of difficulty is calculated, whereby the new level of difficulty of a subsequent question is increased for questions that have been answered correctly and the new level of difficulty of a subsequent question is decreased for questions that have been answered incorrectly.

43. The system of claim 36, wherein when the subject user meets a pre-established level of proficiency in a given content area, subsequent questions are delivered which pertain to a new content area.

44. The system of claim 36, wherein at least one of a calculated new level of difficulty, a calculated new delivery interval, and a calculated new content area for a subsequent question includes a change to at least one of the level of difficulty, the delivery interval, or the content area for the subsequent question.

45. The system of claim 36, wherein re-presenting the question and the selected list of responses to the subject user is adapted to the learning needs of the subject user using temporal spacing, wherein a subject user with a lower baseline knowledge level in a content area receives a subsequent question more frequently than a subject user having a higher baseline knowledge level in the same content area.

46. The system of claim 33, wherein the calculating steps are performed at a central server.

47. The system of claim 33, wherein the steps of presenting the question and re-presenting are accomplished by delivering the question to a computer, portable media device, personal digital assistant, or mobile email receiver as the computer device.

48. The system of claim 33, wherein the calculating steps are performed on the subject user's computer, portable media device, personal digital assistant, or mobile email receiver.

49. The system of claim 33, wherein the calculating in step c includes identification of equivalent responses, said identification being performed by a computer.

50. The system of claim 33, wherein the calculating in step c includes identification of equivalent responses, said identification being is performed by a person different from the subject user.

51. The system of claim 33, wherein the calculating a list of one or more prior free text responses from other subject users (step c) is performed electronically by matching key words of the subject user's response to those in prior responses.

52. The system of claim 33, wherein the calculating of a selected list of responses to the question (step g) is performed electronically through a tally of the most popular answers to the question, as indicated by the number of equivalent answers submitted by users.

53. The system of claim 33, wherein a pre-determined interval of time separates the initial presentation of the question for a free-text response of steps a and b and the re-presentation of the question and the selected list of responses of steps h and i.

54. The system of claim 33, wherein steps h and i are repeated one or more times over spaced intervals of time, each time presenting the same calculated list of responses to the question from which the subject user selects the best answer.

55. The system of claim 33, wherein steps g through i are repeated one or more times over spaced intervals of time, each time presenting a newly-calculated list of responses to the question from which the subject user selects the best answer.

56. The system of claim 55, wherein the newly-calculated list presents the most popular responses to the question.

57. The system of claim 55, wherein the newly-calculated list presents prior responses selected based on multiple variables, including but not limited to popularity, syntax, and key words.

58. The system of claim 55, wherein the newly-calculated list contains the same prior responses as when it was presented to the user previously.

59. The system of claim 33, wherein the question comprises a target curriculum; and
the system further comprising:
j. creating a set of curricular objectives;
k. developing a set of questions and answers that teach the set of curricular objectives.

60. The system of claim 33, further comprising the step of providing the subject user with the correct answer(s) to the question and/or educational material to foster learning about the topic covered by the question.

61. The system of claim 33, wherein the subject user is asked to determine whether the subject user's selected answer of step i is correct or incorrect or whether the question has no correct/incorrect answer.

62. The system of claim 33, wherein the correctness of the answer and its components is determined by one or more computers.

63. The system of claim 33, wherein the correctness of the answer and its components is determined by one or more persons.

64. The system of claim 33, wherein the responses to the questions and their metadata (including but not limited to popularity and equivalent answers) are entered into a searchable electronic database.

* * * * *